United States Patent
Banning

(10) Patent No.: US 10,213,808 B2
(45) Date of Patent: Feb. 26, 2019

(54) SHAKING UNIT AND METHOD FOR THE PNEUMATIC EXCITATION OF A SHAKING UNIT

(71) Applicant: Voith Patent GmbH, Heidenheim (DE)

(72) Inventor: Jürgen Banning, Düren (DE)

(73) Assignee: Voith Patent GmbH, Heidenheim (DE)

( * ) Notice: Subject to any disclaimer, the term of this patent is extended or adjusted under 35 U.S.C. 154(b) by 605 days.

(21) Appl. No.: 14/642,060

(22) Filed: Mar. 9, 2015

(65) Prior Publication Data

US 2015/0174615 A1 Jun. 25, 2015

Related U.S. Application Data

(63) Continuation of application No. PCT/EP2013/068462, filed on Sep. 6, 2013.

(30) Foreign Application Priority Data

| Sep. 18, 2012 | (DE) | 10 2012 018 362 |
| Sep. 18, 2012 | (DE) | 10 2012 018 363 |
| Mar. 25, 2013 | (DE) | 10 2013 205 180 |

(51) Int. Cl.
| *B06B 1/12* | (2006.01) |
| *D21F 1/18* | (2006.01) |
| *F16F 7/10* | (2006.01) |
| *B06B 1/18* | (2006.01) |

(Continued)

(52) U.S. Cl.
CPC ............. *B06B 1/12* (2013.01); *B06B 1/183* (2013.01); *D21F 1/18* (2013.01); *F16F 7/1017* (2013.01);

(Continued)

(58) Field of Classification Search
CPC .. B06B 1/12; B06B 1/183; B06B 1/14; B06B 1/16; B06B 1/18; B06B 1/186;

(Continued)

(56) References Cited

U.S. PATENT DOCUMENTS

| 4,972,930 A | * 11/1990 | Davis ............... F16F 7/1017 |
| | | 188/379 |
| 5,759,354 A | 6/1998 | Graf |

(Continued)

FOREIGN PATENT DOCUMENTS

| DE | 677 169 | 7/1939 |
| DE | 93 17 640.6 U1 | 1/1994 |

(Continued)

OTHER PUBLICATIONS

English translation of EP 0635601 to Arnhold.*

(Continued)

*Primary Examiner* — R. A. Smith
*Assistant Examiner* — John M Royston
(74) *Attorney, Agent, or Firm* — Taylor IP, P.C.

(57) ABSTRACT

A shaking unit for the generation of one-dimensional oscillating movements of a machine part mass is provided having a coupling part for mechanical coupling to the machine part mass, a counter-mass which is coupled resiliently to the coupler part and, via the latter, to the machine part mass, and a drive system which acts in a sprung manner between the coupler part and the counter-mass. The coupling part may surround the counter-mass as a frame. At least one of two pneumatic springs of the drive system, which are arranged on both sides of the counter-mass, is loaded with a minimum and/or with a maximum load pressure of the pneumatic springs depending on an oscillation state.

12 Claims, 2 Drawing Sheets

(51) Int. Cl.
*G01M 7/02* (2006.01)
*G01M 7/04* (2006.01)
*G01M 7/06* (2006.01)
*B06B 1/14* (2006.01)

(52) U.S. Cl.
CPC . *B06B 1/14* (2013.01); *B06B 1/18* (2013.01); *B06B 1/186* (2013.01); *G01M 7/022* (2013.01); *G01M 7/04* (2013.01); *G01M 7/06* (2013.01); *Y10T 74/18992* (2015.01)

(58) Field of Classification Search
CPC .... D21F 1/18; F16F 7/1017; Y10T 74/18992; G01M 7/022; G01M 7/04; G01M 7/06
USPC .......................................... 73/665–667, 672
See application file for complete search history.

(56) References Cited

U.S. PATENT DOCUMENTS

| | | | |
|---|---|---|---|
| 7,051,588 B1 | 5/2006 | Maltby | |
| 2004/0261553 A1* | 12/2004 | Bott | H02K 41/02 74/25 |
| 2008/0080797 A1* | 4/2008 | Asada | F16C 17/107 384/107 |

FOREIGN PATENT DOCUMENTS

| | | | | |
|---|---|---|---|---|
| DE | 102008040111 A1 | * | 11/2009 | ............ B06B 1/183 |
| EP | 0 635 601 A1 | | 7/1994 | |
| EP | 1 624 102 A2 | | 2/2006 | |
| WO | 02/38365 A1 | | 5/2002 | |
| WO | 2009/138491 A1 | | 11/2009 | |

OTHER PUBLICATIONS

Chinese Search Report for corresponding Chinese Application No. 201380048546.8 (3 pages).
German Search Report for corresponding German Application No. 10 2013 205 180.8 (1 page).
Notice of Transmission of the International Research Report and the Written Notice Issued the International Searching Authority or Declaration dated Dec. 9, 2013 for International Application No. PCT/EP2013/068462 (13 pages).
European Office Action dated Dec. 1, 2017 for European Patent Application No. 13 759 501.3 (5 pages).

* cited by examiner

SHAKING UNIT AND METHOD FOR THE PNEUMATIC EXCITATION OF A SHAKING UNIT

CROSS REFERENCE TO RELATED APPLICATIONS

This is a continuation of PCT application No. PCT/EP2013/068462, entitled "SHAKING UNIT AND METHOD FOR THE PNEUMATIC EXCITATION OF A SHAKING UNIT", filed Sep. 6, 2013, which is incorporated herein by reference.

BACKGROUND OF THE INVENTION

1. Field of the Invention

The invention relates to a shaking unit and to a method for pneumatic excitation of a shaking unit.

2. Description of the Related Art

Shaking units and excitation methods are known for example from EP 0 635 601 A1, WO 2009/138491 A1 and U.S. Pat. No. 5,759,354. Here, a machine part mass, namely a roll in a paper machine such as a breast roll in a paper machine is excited by way of a shaking unit into one-dimensional oscillating movements parallel to the roll axis. The shaking unit includes a coupling part for mechanical coupling to the machine part mass, whereby EP 0 635 601 A1 and WO 2009/138491 A1 also disclose a counter mass which is coupled resiliently by the coupling part to the machine part mass. The resilient coupling in the arrangement according to WO 2009/138491 A1 is a hydraulic cylinder-piston unit, whereas EP 0 635 601 A1 utilizes a piston-cylinder unit for this function having springs arranged in piston displacements with the assistance of pneumatic springs formed by the piston displacements and a suitable filling gas within the piston displacements. EP 0 635 601 A1 additionally features an auxiliary piston which can be controlled pneumatically in order to cause a suitable oscillation in the desired manner. The arrangements in EP 0 635 601 A1 and WO 2009/138491 A1 have in common that the counter mass must have a relatively high weight and be able to freely oscillate while at the same time supporting a cylinder in which a piston moves back and forth and which is connected rigidly in the oscillation direction with the machine part mass, in other words with the respective roll.

What is needed in the art is a shaking unit of this type or respectively an excitation method of this type which is less complex.

SUMMARY OF THE INVENTION

The present invention provides shaking units or respectively excitation methods having a highly symmetrical design of the shaking unit, resulting in an accordingly compact arrangement.

The invention relates in particular to a shaking unit for the generation of one-dimensional oscillating movements of a machine part mass having a coupling part for mechanical coupling to the machine part mass, having a counter mass which is coupled resiliently to the coupling part and, via the latter, to the machine part mass, and having a drive system which acts in a sprung manner between the coupling part and the counter mass. The invention further relates to a method for pneumatic excitation of a shaking unit for the generation of one-dimensional oscillating movements of a machine part mass having a coupling part for mechanical coupling to the machine part mass, having a counter mass which is coupled resiliently to the coupling part and, via the latter, to the machine part mass, and having a drive system which acts in a sprung manner between the coupling part and the counter mass.

Accordingly a shaking unit for the generation of one-dimensional oscillating movements of a machine part mass has a coupling part for mechanical coupling to the machine part mass, a counter mass which is coupled resiliently to the coupling part and, via the latter, to the machine part mass, and a drive system which acts in a sprung manner between the coupling part and the counter mass. The drive system includes two pneumatic springs which are arranged on both sides of the counter mass. This results in a highly symmetrical action of the pneumatic springs, whether they are embodied by displacements of a piston arranged in a cylinder, bellows, or similar devices, in each case by way of pressure upon the counter mass. As a result, complex rods which react to tension and pressure and highly delicate cylinders which protrude from the counter mass as disclosed for example in EP 0 635 601 A1 can be avoided. By utilizing pneumatic springs, complex hydraulic systems according to WO 2009/138491 A1 can also be avoided.

The drive system is pneumatically actuated. A compact design results from the pneumatic excitation acting directly upon the pneumatic springs, so that an additional rod assembly is unnecessary.

In another embodiment, a shaking unit for the generation of one-dimensional oscillation movements of a machine part mass again has a coupling part for mechanical coupling to the machine part mass, a counter mass which is coupled resiliently to the coupling part and, via the latter, to the machine part mass, and a drive system which acts in a sprung manner between the coupling part and the counter mass. In this embodiment, the coupling part surrounds the counter mass as a frame. The coupling part surrounding the counter mass is nowhere referred to in the current state of the art, and results in an accordingly symmetric and compact design. Furthermore, with a suitable arrangement which is described in further detail below, it is possible to reduce the number of moving assemblies which are accessible from the outside to a minimum. Protection from contamination and possible sealing problems are thus improved, and accident prevention measures can be reduced.

The coupling part can in particular be a shaking unit housing in which the counter mass is arranged. In this way the oscillating counter mass is protected by the shaking unit housing which, because it is used as coupling part, is then accordingly connected with the machine part mass. In particular feedthroughs through a cylinder, as are absolutely necessary in EP 0 635 601 A1 and in WO 2009/138491 A1 can be avoided. In this way, a very compact shaking unit results, wherein seals and feedthroughs which are naturally subject to contamination are eliminated. In this arrangement of the counter mass being located inside the shaking unit housing, only one assembly group remains which is accessible from the outside and which oscillates uniformly with the machine part mass, since the counter movement of the counter mass occurs inside the shaking unit housing. Due to this single movement direction with a suitable arrangement of the shaking unit, the risk of accidents is accordingly also further reduced.

Depending on the specific application, the coupling part can surround the counter mass in a gastight configuration. This applies in particular in a case where the coupling part is a shaking unit housing in which the counter mass is arranged. Due to such gas-tightness, feedthroughs which are under pressure, as needed on the feedthroughs of piston rods from cylinders which are supplied with pressure, can be completely avoided. In such an arrangement the coupling part, or respectively the shaking unit housing can, with the assistance of the counter mass, form pneumatic springs on each side of the counter mass respectively which can then be utilized resiliently or if required also for pneumatic excitation.

In one alternative embodiment, it is not necessary that the coupling part surrounds the counter mass gas tightly. In this alterative embodiment, separate pneumatic springs, for example bellows or other gas-pressurized arrangements are used, which act between the coupling part or the shaker unit housing and the counter mass. Depending on the embodiment, it is then only necessary to provide appropriate gas connections in order to make possible a pneumatic excitation or refilling of leakages. In particular, leakages which occur with piston rods that are moved back and forth through a feedthrough can be completely avoided.

In another embodiment, the coupling part is integrated into the machine part mass itself, so that the entire shaking unit is arranged inside the machine part mass, for example inside a roll. Also with this arrangement, which is especially compact, the coupling part in the form of a partial machine frame then surrounds the counter mass, for example in the form of a roll body, which forms the shaking unit housing.

In another embodiment, the counter mass is mounted on the coupling part capable of oscillation, so that further measures for mounting the counter mass can be foregone. This also results in a correlative compactness of the entire shaking unit.

In another embodiment of the invention, the counter mass is composed of several partial masses. The partial masses are hereby preferably rigidly coupled with each other to form one single oscillating mass.

In another embodiment, a space for storing fluid, for example gas and/or liquid, is disposed in the counter mass.

Hydrostatic or hydrodynamic mounting, or also possibly pneumatic mounting can ensure an especially low friction mounting, whereby losses and consequently the total energy which must be introduced into the shaking unit in order to maintain oscillation in resonance can be reduced to a minimum. As a result, friction losses can be minimized, such that the counter mass floats in the hydrostatic or hydrodynamic mounting. The hydrostatic or hydrodynamic mounting may be a circulating oil lubrication, so that sufficient oil is provided to all operating positions and conditions.

Depending on the embodiment, a relatively low piston weight, especially in combination with a floating counter mass, may be enough for sufficient resonance movement. The counter mass may be provided with recesses which are limited by separation walls in order to thus minimize the required piston displacement and consequently the size of the shaking unit housing, for example if it surrounds a piston-like counter mass.

Furthermore, due to floating of the counter mass, the gliding surfaces of the same can also be minimized, thus further reducing losses. This may also be achieved by reducing the viscosity of the oil being used which, accordingly, results in lower losses. If required, the pressure of the circulating oil lubrication can be increased relative to the pressure which is necessary for operational safe floating in order to reduce leakages of the oil lubrication around the counter mass to a minimum.

Even though mounting of the counter mass in relation to the coupling part is of considerable importance for the losses, the coupling part may also be mounted capable of oscillation relative to a machine floor. The coupling part oscillates naturally with the frequency and amplitude of the machine part, or respectively the machine part mass, which is activated by the shaker unit to oscillate. Similar assembly groups can be used as also serve the mounting of the machine part mass.

If required, a joint may be provided between the coupling part and the machine part mass in order to permit greater mounting tolerances in the vertical direction and to permit replacement in a simple manner breast rolls having different diameters, without complex readjustment of the shaking unit.

Alternatively, the connection between the coupling part and the machine part mass may be designed rigidly in the direction of the oscillation movement, in order to implement the oscillations directly, without any overlay oscillations.

It is understood that such a joint between the coupling part and the machine part mass and/or such a joint support of the shaking unit on a machine floor may be used independently from the remaining characteristics of the current embodiment.

The shaking unit itself can be excited simply mechanically, in that an eccentric or a suitably actuated excitation mass having defined excitation frequency may be attached on the counter mass or on the coupling member.

In another embodiment, a pneumatic excitation is used, wherein a method of pneumatic excitation of a shaking unit is used for the generation of one-dimensional oscillating movements of a machine part mass having a coupling part for mechanical coupling to the machine part mass, a counter mass which is coupled resiliently to the coupling part and, via the latter, to the machine part mass, and a drive system which acts in a sprung manner between the coupling part and the counter part. At least one of two pneumatic springs of the drive systems which are arranged on both sides of the counter mass is loaded with a minimum and/or with a maximum load pressure of the pneumatic springs, depending on the state of the oscillation. In this manner, separate excitation can be foregone, and supply of the pneumatic springs via suitable pressure lines can be realized easily without great expenditure.

A standard control technology may be used to excite the oscillating system by supplying energy at suitable points in time within the oscillation cycle, in other words at suitable oscillation conditions in order to maintain the oscillation. This energy supply may be configured to supply the pneumatic spring under high pressure with yet additional pressure, so that possible energy losses which occur in the process of building up the pressure may be compensated for. The reverse process then occurs with the required energy in order to be able to implement a full oscillation stroke. It is hereby understood that this can be implemented accordingly on the pneumatic springs on both sides of the counter mass. It is also understood that in certain conditions it is sufficient to implement this on only one of the two pneumatic springs.

It is also understood that it may be sufficient to merely to lower the maximum load pressure at certain times. Alternatively, the load pressure may be lowered to a minimum pressure in instances where a very low load pressure is sufficient to additionally excite oscillations. The oscillation frequency of the oscillation movement may be influenced via the load pressure of the pneumatic springs, so that the oscillation can be adapted to the current conditions without extensive conversion measures.

BRIEF DESCRIPTION OF THE DRAWINGS

The above-mentioned and other features and advantages of this invention, and the manner of attaining them, will

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
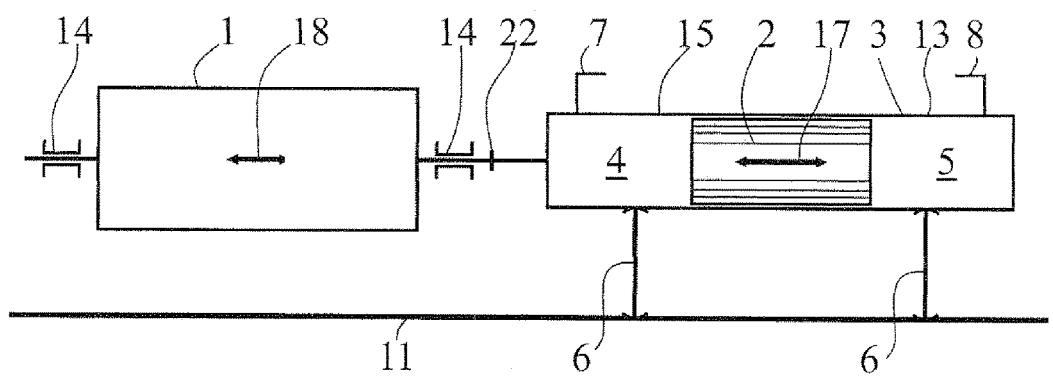
FIG. 1 is a schematic side view of a breast roll as the machine part mass, as well as a first shaking unit.

The arrangement illustrated in FIG. 1 includes one machine part mass 1 and one shaking unit 3 including a counter mass 2 coupled to the machine part mass 1, which is mounted in bearings 14 in an already known manner. Shaking unit 3 hereby includes a cylinder 15, which surrounds the counter mass 2 in the form of shaking unit housing 13 and which, on both sides of counter mass 2, creates piston displacement spaces 4 and 5 which, assisted by counter mass 2 in the form of a piston forms two pneumatic springs. Shaking unit 3 is supported on two roll supports 6 on machine floor 11 and is coupled via a coupling 22 in an already known manner with machine part mass 1 which, in this example is in the embodiment of a breast roll.

Counter mass 2 is excited into oscillations 17 (double arrow) by pneumatic lines 7 and 8. The system consisting of machine part mass 1 and cylinder 15 follows accordingly with a counter movement through oscillations 18 (double arrow). The excitation via pneumatic lines 7 and 8 occurs in such a way that the entire system oscillates in resonance frequency.

Figure 2:
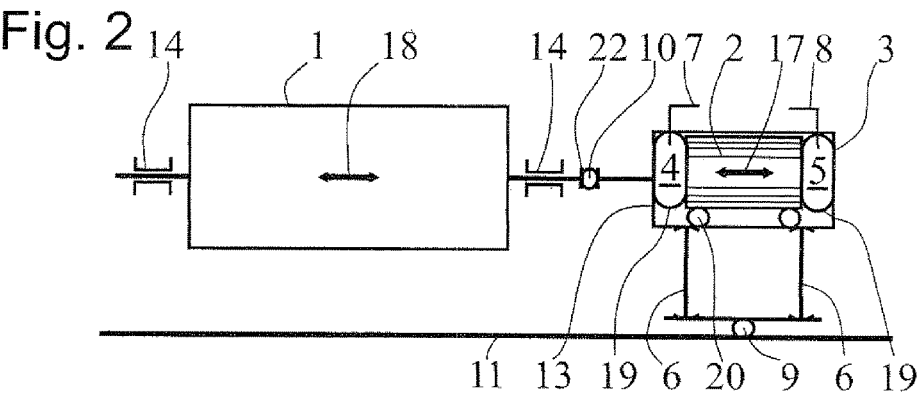
FIG. 2 is a schematic side view of a breast roll as the machine part mass, as well as a second shaking unit.

The arrangement illustrated in FIG. 2 is similar to the arrangement illustrated in FIG. 1. In contrast to the arrangement in FIG. 1, however, the piston displacements 4 and 5 in the arrangement according to FIG. 2 are created by bellows 19 which are connected accordingly with the pneumatic lines 7 and 8 and which are supplied in a very similar manner as is shown in the arrangement in FIG. 1 with compressed air via these pneumatic lines 7 and 8. Moreover, counter mass 2 is mounted in antifriction bearings 20 in shaking the unit housing 13 instead of in pneumatic or hydrostatic or hydrodynamic mounting.

In the embodiment shown in FIG. 2, shaking unit 3 is also mounted through a joint 9 on machine floor 11 and through a joint 10 with machine part mass 1, whereby joint 10 is inherently rigid in machine direction. In this manner, an adaptation to various machine parts masses 1 can occur more easily, requiring no change in the use of roll supports 6. Depending on a specific application of this embodiment, joints 9 and/or 10 can be immobilized during operation in order to avoid the risk of overlay oscillations.

Figure 3:
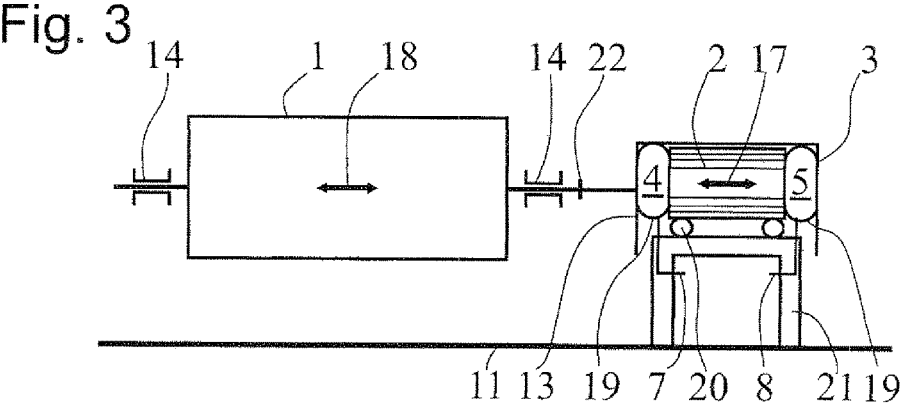
FIG. 3 is a schematic side view of a breast roll as the machine part mass, as well as a third shaking unit.

In contrast to the embodiment illustrated in FIG. 2, mounting of counter mass 2 in a cylinder 15 of shaking unit housing 13 has been eliminated in the embodiment according to FIG. 3, and counter mass 2 is mounted accordingly via a anti friction bearing 20 on a mounting table 21 with the capability to oscillate. This mounting table 21 also carries pneumatic lines 7 and 8 to bellows 19. In this arrangement shaking unit housing 13 is open at the bottom, wherein counter mass 2 is housed and accordingly protected as before.

Figure 4:
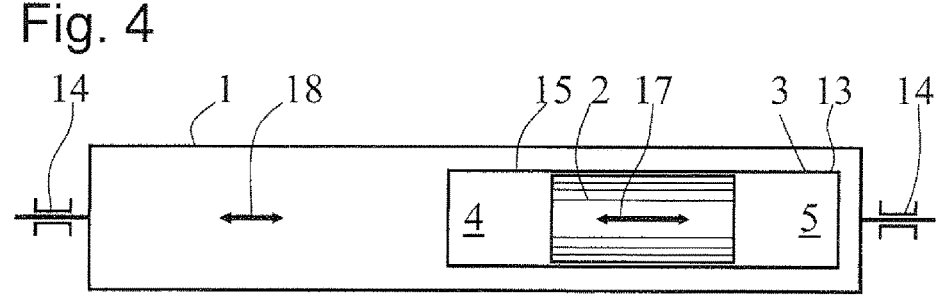
FIG. 4 is a schematic side view of a breast roll as the machine part mass with an integrated shaking unit in a similar depiction as in FIGS. 1 to 3.

In the embodiment illustrated in FIG. 4, shaking unit 3 is integrated in machine part mass 1, which in this example is also a breast roll of a paper machine. Machine part mass 1 therefore embodies the shaking unit housing 13 and cylinder 15 of shaking unit 3 arranged within machine part mass 1. This arrangement provides for an especially compact design, wherein a strong energy source, for example a compressed air storage device or for example a battery which can alternatively supply piston displacements spaces 4 and 5 with pressure, is provided for excitation of a resonance oscillation. Also, pneumatic lines can be provided at a suitable location, for example on roll journals on the rotation axis.

Figure 5:
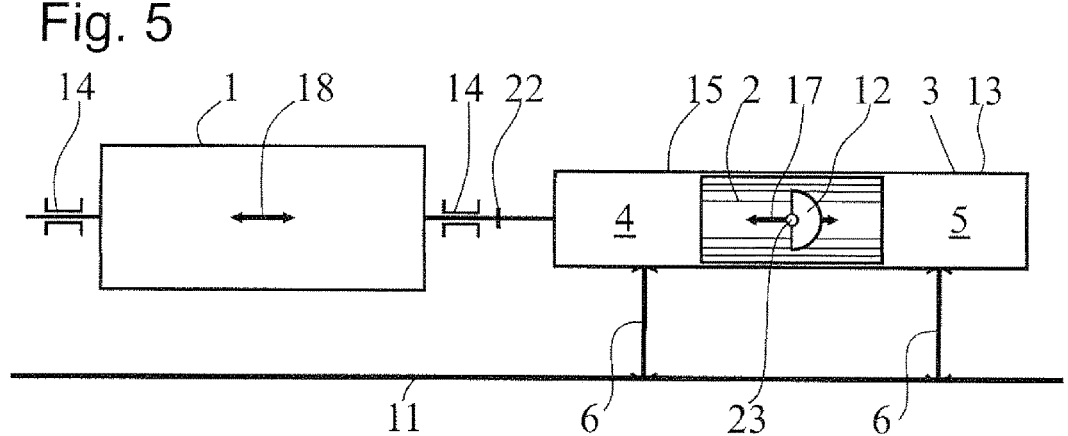
FIG. 5 is a schematic side view of a breast roll as the machine part mass, as well as a fourth shaking unit.

The arrangement illustrated in FIG. 5 is similar to the arrangement according to FIG. 1. However, pneumatic lines 7 and 8 have been eliminated. For energy supply an excitation mass 12 is provided in counter mass 2, whereby excitation mass 12 is driven by an electric motor eccentrically around an axis 23, but which can also be driven by other methods in other embodiments. The frequency of rotation of excitation mass 12 is hereby selected so that the entire system consisting of machine part mass 1, cylinder 15, and counter mass 2 is excited into oscillations in the range of a resonance frequency. A gas supply to piston displacements 4 and 5 does not have to be provided. However, in order to influence the oscillations, gas connections may be provided through which the gas pressure in piston displacements 4 and 5 can be altered.

Figure 6:
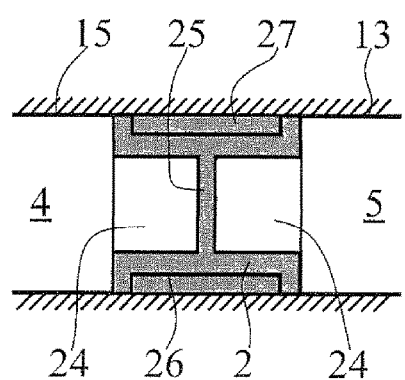
FIG. 6 is a sectional view of an alternative shaking device

FIG. 6 illustrates an alternative counter mass 2, which includes recesses 24 which are limited by a separation wall 25, whereby the length of cylinder 15 is reduced. A continuous recess 26 in counter mass 2 in this embodiment may also be used alternatively in the embodiments according to FIGS. 1, 4, and 5, and forms an annulus 27 together with cylinder 15 which can be supplied with lubrication oil. The mass of counter mass 2 in this embodiment is preferably consistent with the overall weight of the lubrication oil volume which is being displaced by counter mass 2, so that counter mass 2 rises approximately to the top. Gliding and mounting surfaces, as well as possible losses can hereby be limited to a minimum. Through a variation of separation wall 26, which may be a two-part separation wall, the volume of piston displacements 4 and 5 and the mass of counter mass 2 can be easily adapted to desired conditions.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST

1 machine part mass
2 counter mass 3 shaking unit
4 piston displacement
5 piston displacement
6 roll supports
7 pneumatic line
8 pneumatic line
9 joint
10 joint
11 machine floor
12 excitation mass
13 shaking unit housing
14 bearing
15 cylinder
17 oscillations
18 oscillations
19 bellow
20 antifriction bearing
21 mounting table
22 coupling
23 axis
24 recess
25 separating wall
26 continuous recess
27 annulus

What is claimed is:

1. A shaking unit for the generation of one-dimensional oscillating movements of a machine part mass, comprising:
a coupling part for mechanical coupling to said machine part mass;
a counter mass having a pair of sides which is coupled resiliently to said coupling part and to said machine part mass; and
a drive system which acts in a sprung manner between said coupling part and said counter mass, said coupling part surrounding said counter mass as a frame, and said counter mass is arranged therein so as to oscillate back and forth, wherein said drive system includes a pair of gas springs arranged on both sides of said counter mass so that said counter mass is pneumatically excited and a pneumatic excitation acts directly on said gas springs.

2. The shaking unit according to claim 1, wherein said coupling part is a shaking unit housing in which said counter mass is arranged.

3. The shaking unit according to claim 1, wherein said coupling part surrounds said counter mass gas tightly.

4. The shaking unit according to claim 1, wherein said coupling part is integrated into said machine part mass.

5. A shaking unit for the generation of one-dimensional oscillating movements of a machine part mass, comprising:
a coupling part for mechanical coupling to said machine part mass;
a counter mass which is coupled resiliently to said coupling part and to said machine part mass; and
a drive system which acts in a sprung manner between said coupling part and said counter mass, said drive system including two pneumatic springs which are arranged on both sides of said counter mass, and said coupling part at least partially houses said counter mass such that said pneumatic springs are respectively arranged in between and contact the sides of said counter mass and said coupling part, wherein said drive system is pneumatically actuated to excitation, and said pneumatically actuated excitation acting directly on said two pneumatic springs.

6. The shaking unit according to claim 5, wherein said counter mass is mounted on said coupling part, said coupling part being capable of oscillation.

7. The shaking unit according to claim 6, wherein said mounting of said counter mass on said coupling part occurs one of hydrostatically and hydro-dynamically.

8. The shaking unit according to claim 7, wherein said counter mass floats in said one of hydrostatic and hydrodynamic mounting.

9. The shaking unit according to claim 7, wherein said one of hydrostatic and hydrodynamic mounting is a circulating oil lubrication.

10. The shaking unit according to claim 5, wherein said coupling part is mounted capable of oscillation relative to a machine floor.

11. The shaking unit according to claim 5, wherein said mechanical coupling between said coupling part and said machine part mass is rigid in the direction of said oscillation movements.

12. The shaking unit according to claim 5, wherein:
said mechanical coupling between said coupling part and said machine part mass is a joint having tolerance in a vertical direction perpendicular to said oscillating movements; and
said shaking unit is mounted through a joint to a machine floor.

* * * * *